United States Patent
Boffa et al.

(10) Patent No.: US 9,835,524 B2
(45) Date of Patent: Dec. 5, 2017

(54) METHOD FOR SEGMENTING THE SURFACE OF A TYRE AND APPARATUS OPERATING ACCORDING TO SAID METHOD

(71) Applicant: PIRELLI TYRE S.p.A., Milan (IT)

(72) Inventors: Vincenzo Boffa, Milan (IT); Marco Gallo, Settimo Torinese (IT); Bartolomeo Montrucchio, Turin (IT)

(73) Assignee: PIRELLI TYRE S.P.A., Milan (IT)

( * ) Notice: Subject to any disclaimer, the term of this patent is extended or adjusted under 35 U.S.C. 154(b) by 330 days.

(21) Appl. No.: 14/416,976

(22) PCT Filed: Jul. 23, 2013

(86) PCT No.: PCT/IB2013/056023
§ 371 (c)(1),
(2) Date: Jan. 23, 2015

(87) PCT Pub. No.: WO2014/020485
PCT Pub. Date: Feb. 6, 2014

(65) Prior Publication Data
US 2015/0226644 A1    Aug. 13, 2015

Related U.S. Application Data

(60) Provisional application No. 61/678,709, filed on Aug. 2, 2012.

(30) Foreign Application Priority Data

Jul. 31, 2012 (IT) .............................. PD2012A0234

(51) Int. Cl.
*G01N 21/00* (2006.01)
*G01M 17/02* (2006.01)
*B29D 30/00* (2006.01)

(52) U.S. Cl.
CPC ....... *G01M 17/027* (2013.01); *B29D 30/0061* (2013.01); *B29D 2030/0066* (2013.01)

(58) Field of Classification Search
CPC ... G01B 11/162; G01B 11/2522; G01B 11/24; G01B 11/30; G01B 11/22; G01B 11/25;
(Continued)

(56) References Cited

U.S. PATENT DOCUMENTS

2009/0293603 A1*  12/2009  Douglas ................. G01B 21/12
                                                                         73/146
2010/0002244 A1    1/2010  Iino et al.
(Continued)

FOREIGN PATENT DOCUMENTS

EP          2 110 656          10/2009
WO     WO 2012/052301       4/2012

OTHER PUBLICATIONS

R. Gonzalez, R. Woods, "Digital Image Processing", Prentice Hall, 2008, pp. v-xiii, xv-xxii and 1-103.
(Continued)

*Primary Examiner* — Michael P Stafira
(74) *Attorney, Agent, or Firm* — Finnegan, Henderson, Farabow, Garrett & Dunner, L.L.P.

(57) ABSTRACT

A method for segmenting the surface of a tire including at least one groove, includes: irradiating a portion of the surface of the tire by means of electromagnetic radiation having a wavelength in the visible spectrum; acquiring an image of the irradiated portion of the surface; and processing the image so as to segment it into regions corresponding to regions of the tire which do or do not belong to the at least one groove. Additionally, processing the image so as to segment it includes: calculating a statistical quantity associated with the irradiation by electromagnetic radiation for each region of the image; and determining whether the region of the image does or does not belong to the at least one groove according to the value of the statistical quantity. Equipment for segmenting a surface of a tire including at least one groove.

37 Claims, 7 Drawing Sheets

(58) Field of Classification Search
CPC ... G01B 11/2509; G01B 11/02; G01B 11/245; G01N 21/8851; G01N 21/8806; G01N 21/95; G01N 21/952; G01N 21/954
See application file for complete search history.

(56) References Cited

U.S. PATENT DOCUMENTS

2011/0018999 A1   1/2011   Joly et al.
2015/0002847 A1*   1/2015   Sukegawa .............. G01B 11/24 356/445

OTHER PUBLICATIONS

International Preliminary Report on Patentability, in corresponding international application No. PCT/IB2013/056023, dated Feb. 3, 2015.

Zhang et al.; "A Quadric Image Segmentation for the Feature Extraction of Tire Surface Wear", Proceedings of the Sixth International Conference on Intelligent Systems Design and Applications, IEEE Computer Society, pp. 457-462, (2006).

International Search Report from the European Patent Office for International Application No. PCT/IB2013/056023, dated Dec. 9, 2013.

Written Opinion of the International Searching Authority from the European Patent Office for International Application No. PCT/IB2013/056023, dated Dec. 9, 2013.

* cited by examiner

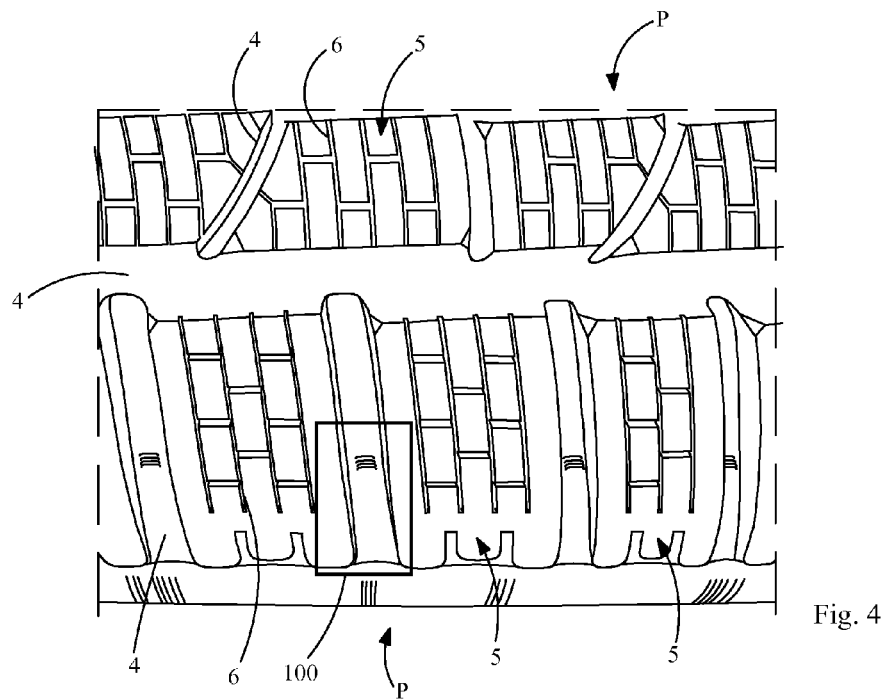
Fig. 4
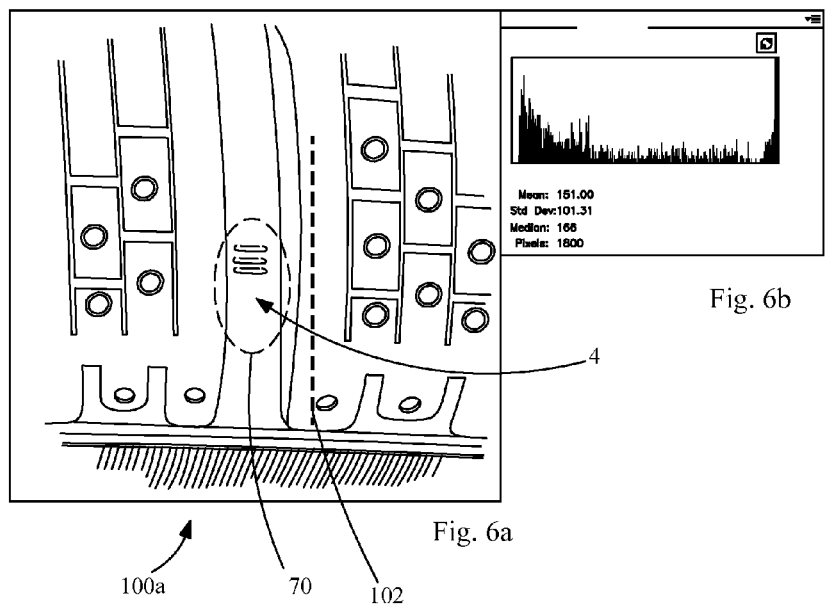
Fig. 6a
Fig. 6b

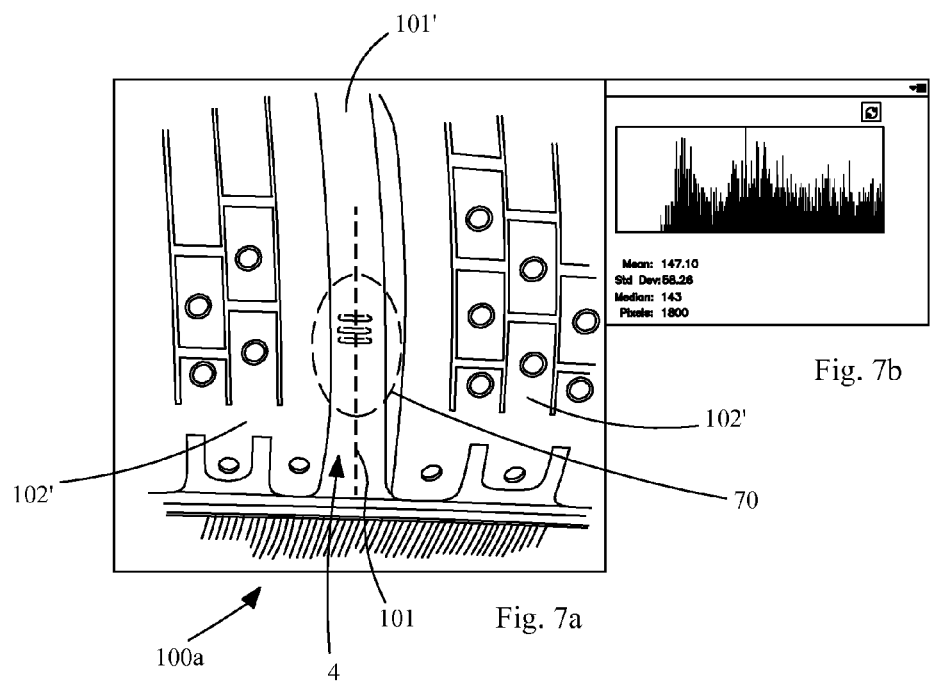
Fig. 7a
Fig. 7b
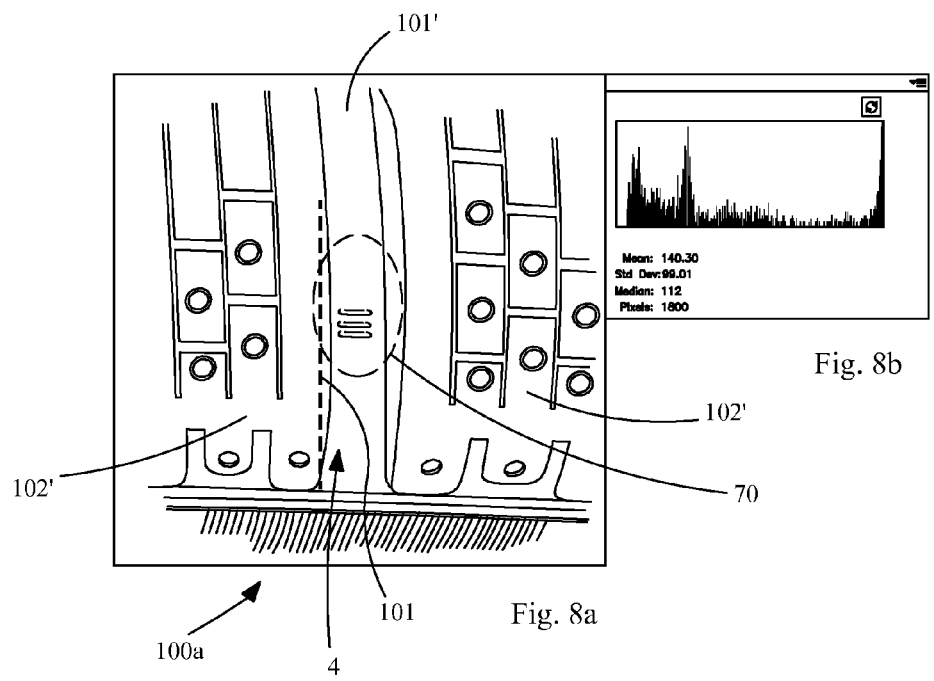
Fig. 8a
Fig. 8b

METHOD FOR SEGMENTING THE SURFACE OF A TYRE AND APPARATUS OPERATING ACCORDING TO SAID METHOD

CROSS REFERENCE TO RELATED APPLICATIONS

This application is a national phase application based on PCT/IB2013/056023, filed Jul. 23, 2013, which claims the priority of Italian Patent Application No. PD2012A000234, filed Jul. 31, 2012, and the benefit of U.S. Provisional Application No. 61/678,709, filed Aug. 2, 2012, the content of each application being incorporated herein by reference.

BACKGROUND OF THE INVENTION

Field of the Invention

The present invention relates to a method for segmenting the surface of a tyre and to an equipment operating according to this method. The method and equipment according to the invention can be used to detect in a precise and accurate way areas on the tyre surface having different characteristics, and consequently to segment the surface of the tyre into groups of areas or pixels having similar properties.

Description of the Related Art

Tyres, particularly top-range models, but also those not rated as high-performance, are usually carefully inspected after building and/or after vulcanization, in order to measure or discover a plurality of characteristics of the tyres, the values of which may, for example, lead to the rejection or acceptance of the tyres. For example, the tyre surface is carefully examined in order to discover any defects, non-uniformities or other faults, and the tyre is considered to be acceptable if these measured parameters fall within certain ranges of acceptable values, or if they are found to be absent or present. These ranges of values vary with the type, model, size and intended use of the tyres.

A tyre generally comprises a carcass structure, in the shape of a toroidal ring, including one or more carcass plies, reinforced with reinforcing cords lying in radial planes (in the case of what are known as radial tyres), in other words in planes containing the axis of rotation of the tyre. The ends of each carcass ply are fixed to at least one metal annular structure, usually known as the bead core, which reinforces the beads, in other words the radially inner extremities of said tyre, which serve to fit the tyre on a corresponding mounting rim. A band of elastomeric material, called the tread band, is placed on the crown of said carcass structure, and a relief design for ground contact is formed in this tread band at the end of the curing and moulding stages. A reinforcing structure, usually known as the belt structure, is placed between the carcass structure and the tread band. In the case of tyres for a car, this belt structure usually comprises at least two radially superimposed strips of rubberized fabric provided with reinforcing cords, usually metallic, positioned parallel to each other in each strip and crossing the cords of the adjacent strip, the cords preferably being positioned symmetrically about the equatorial plane of the tyre. Preferably, said belt structure also comprises a third layer of fabric or metal cords placed circumferentially (at 0 degrees) in a radially outer position, at least on the ends of the underlying strips.

Sidewalls of elastomeric material are also applied to the corresponding lateral surfaces of the carcass structure, each extending from one of the lateral edges of the tread band to the position of the corresponding fixing annular structure to the beads.

The term "groove" (in a tyre) denotes a recess formed on one of the surfaces of the tyre, not necessarily in the surface of the tread, but also, for example, in the radially inner surface of the tyre. In the specific case of the tread surface, a groove is defined as a recess forming part of the tread design defined above, which preferably separates two blocks of the tread. Since the groove is a recess, it is possible to identify a bottom surface and a top surface, where the top surface essentially coincides with the radially outer surface of the blocks separated by the groove, and the bottom surface is defined as a portion of the tyre surface spaced apart radially from the top surface and in a radially inner position with respect to the latter. The bottom and top surface are preferably continuously interconnected by lateral walls, which may be essentially perpendicular to a plane locally tangent to the top surface, or inclined with respect thereto. The bottom surface and lateral walls are considered to belong to the groove, while the top surfaces are considered not to belong to the groove. In the tyre surface, therefore, it is possible to define portions of surface belonging to a groove, in other words portions of surface belonging to either the bottom surface or the lateral walls, and portions of surface not belonging to a groove, in other words those forming part of the top surface.

Generally, a groove extends in a direction called the longitudinal direction, and in particular it has a longitudinal extension greater than its transverse dimension, although other geometries may be encountered.

A "defect" in a tyre is a characteristic of the tyre which is undesired, although it does not necessarily lead to the rejection of the tyre. Examples of types of defect are foreign bodies in the covering, under-vulcanization, open joints, defects within the grooves such as bubbles under a tread block, flash and steps on the tread, and exposed cords on the tread.

The term "exposed cord" denotes a tyre defect in which a textile or metal cord, for example (but not necessarily) one placed at 0 degrees, is "exposed" by the elastomeric material, or is at least visible under the material, in a groove of the tyre, because the elastomeric material is too thin. The elastomeric material above the cord has a "corded" appearance (hence the name) which is particularly difficult to identify.

The term "source of electromagnetic radiation" denotes one or more of a variety of radiation sources, including, but not limited to, sources based on LEDs (using one or more LEDs as defined below), incandescent sources (for example, filament lamps or halogen lamps), fluorescent sources, phosphorescent sources, discharge sources, lasers, and others.

A radiation source may be configured to generate electromagnetic radiation within the visible spectrum, outside the visible spectrum, or in both of these. The expression "source of light radiation emitting radiation in the visible spectrum" therefore signifies a source that emits radiation either in the visible spectrum only, or in the visible spectrum and in other spectra also. Since we are specifically concerned with radiation sources in the visible spectrum in the present context, the terms "radiation" and "light" are used interchangeably. Furthermore, a radiation source may include one or more filters, lenses or other optical components.

The expression "telecentric" radiation signifies a radiation source that emits electromagnetic radiation in the form of a plurality of rays essentially parallel to each other.

The expression "almost telecentric" radiation signifies a radiation source that emits electromagnetic radiation in the form of a plurality of rays forming an angle of less than about ±10° with each other. Consequently, "almost telecentric" sources include telecentric sources. Radiation is also described as essentially grazing with respect to a surface when the rays making up the radiation form an angle of not more than about ±15°, or more preferably about ±5°, with the surface.

The term "spectrum" is to be interpreted as referring to one or more radiation frequencies produced by a radiation source. The term "visible spectrum" generally denotes light radiation having a wavelength in the range from about 380 nm to about 760 nm.

The term "colour" of a radiation is used here interchangeably with the term "spectrum". However, the term "colour" is used primarily to refer to a property of the radiation that can be perceived by an observer.

In the following text, the term "LED" refers to light-emitting diodes of any type which are configured to emit radiation in a specified spectrum. An LED therefore includes, but is not limited to, a semiconductor structure which emits radiation in response to a current. Organic semiconductor structures (for example OLEDs) are also included in the present definition. The term "different colour LEDs" therefore denotes LEDs emitting radiation with separate spectra, in other words spectra having different bandwidths and/or spectral components. The term "colour" generally refers to radiation in the visible spectrum, but the radiation (or "light", interpreted as having the same meaning) emitted by the LEDs may also be within the infrared range, the ultraviolet range or a combination thereof with visible light.

The description of a radiation source, for example an LED, as "white", "red", etc., is to be interpreted as meaning a source emitting radiation predominantly perceived as "white", "red" and so on, although the source may also emit other radiation.

US 2010/0002244 describes a method for inspecting the surface of a tyre capable of reliably discriminating rubber pieces having a quality different from that of the tyre, these pieces being incorporated in the tyre surface as a result of the vulcanization of the tyre. A first illumination unit includes two light projectors which project light from two opposite sides towards an objective line on a tyre. A second illumination unit includes a pair of second projectors which project light from opposite sides towards the objective line in a different direction from that in which the first illumination unit projects light. The first and second units operate alternately. A linear video camera forms an image of part of the tyre surface corresponding to the objective line in synchronization with the illumination process of the first and second illumination units. The images are analysed for the inspection of the tyre surface.

US 2011/0018999 describes a device for evaluating the appearance of a tyre surface, comprising a colour linear video camera including means for separating a light beam reflected by the surface of said tyre and entering the video camera in at least two primary colours having given wavelengths, such that the light beam is directed towards a number of sensors such that a basic grey scale image is obtained for each primary colour. The device also includes a number of lighting means equal to the number of the primary colours, said lighting means being orientated so as to light the surface to be evaluated at different angles. The device is characterized by the fact that each lighting means emits a coloured light which is different from that emitted by the other lighting means, and whose wavelength essentially corresponds to the wavelength of one of the primary colours selected by the video camera.

WO 2012/052301 describes a method for inspecting a tyre tread having a tread design formed by the set of circumferentially juxtaposed elements separated by boundaries having known identical shapes and a reduced number of basic patterns placed in sequence in a predetermined way.

SUMMARY OF THE INVENTION

The applicant has observed that the systems for processing images of the tyre surface used in the field are not generally sufficiently accurate for detecting all the defects and/or characteristics of interest.

As is known, the final colour of a tyre is generally black, owing to the presence of carbon black. The design on the tread band is produced by forming a plurality of grooves, which are essentially recesses in the tread. In particular, in a typical structural configuration, a tyre comprises a tread band on which is defined a plurality of grooves extending circumferentially and transversely, delimiting a corresponding plurality of blocks. In the case of winter tyres, a plurality of small transverse notches, known as "sipes", is also formed in each of the blocks.

The applicant has noticed that, according to the aforementioned documents, the tyre surface is inspected by irradiation with electromagnetic radiation, with the production of images, such as digital images, of the light reflected by the tyre. However, the black colour, with the inevitable "fading" and differences in colour intensity, the presence of a plurality of recesses having different dimensions and orientations in the tyre surface, which generate "shadows" and other phenomena, the curvature of the tread surface, and the existence of a plurality of positioning marks, as well as dust, oil and other substances that may contaminate the tread surface, combine to make the analysis and processing of the acquired images extremely complicated and difficult, and in particular make it difficult to avoid errors, failed identification of defects, incorrect measurements, or "false positives".

The applicant therefore wishes to provide a method and equipment which can improve the efficiency in terms of accuracy of inspection of the tyre, thereby enabling the requisite defects and parameters of its surface to be detected while reducing errors.

However, the applicant has detected that, in order to achieve this, it is not sufficient to improve the method of lighting the tyre surface, since, even with the best possible lighting, the images of the tyre surface to be examined are difficult to process, for the aforementioned reasons.

Indeed, the applicant has perceived that it is necessary not only to improve the lighting, but also to provide "pre-processing" of the acquired images before the inspection can be conducted with the required degree of reliability.

Finally, the applicant has found that this pre-processing must include segmentation of the acquired images into areas having similar characteristics; in other words, it includes segmentation of the image into "groove" and "non-groove" areas, so as to divide the acquired image into areas of the tyre surface corresponding to the presence of a groove (or part thereof) and areas of the tyre surface which are outside the grooves.

This segmentation preferably takes place by means of appropriate statistical analysis of the characteristics of the various regions, such as for example areas of pixels, forming the acquired images.

In particular, in a first aspect, the invention relates to a method for segmenting the surface of a tyre including at least one groove.

Preferably, said method comprises irradiating a portion of said surface of said tyre with electromagnetic radiation having a wavelength in the visible spectrum.

Preferably, the method comprises acquiring an image of said portion of the irradiated surface.

Preferably, provision is made to process said image so as to segment it into regions corresponding to regions of the tyre which do or do not belong to said at least one groove.

Preferably, said processing includes calculating a statistical quantity associated with the irradiation by said electromagnetic radiation for each region of said image.

Preferably, said processing comprises determining whether said region of said image does or does not belong to said at least one groove according to the value of said statistical quantity.

The applicant believes that a division of the image into separate regions enables the processing of the image to be continued thereafter in a simplified way. When divided into regions, the image allows the examination to be limited, for example, to the regions of the image corresponding to the groove, or to those corresponding to regions outside the groove. The exclusion of non-relevant regions eliminates many of the causes of processing error.

For example, by dividing the acquired images of the tyre surface into "groove regions" and "non-groove regions" and applying known algorithms for the detection of defects, non-uniformities or other characteristics to one or other of these two groups, the applicant has noticed that the degree of accuracy is improved by comparison with the application of these algorithms without this upstream segmentation, and that, in particular, it is possible to identify in this way defects that cannot be detected with other solutions.

According to a second aspect, the invention relates to a method for detecting defects on a surface of a tyre, including the method for segmenting the surface of a tyre according to the first aspect, comprising:

processing at least one of said regions of said image belonging to said at least one groove, for the detection of defects within it.

The applicant therefore believes that, following the segmentation described above, a plurality of analyses known in the art can be carried out with greater precision and accuracy, thus reducing the error rate and enabling a particularly detailed inspection of the tyre to be made. According to a third aspect, the invention relates to equipment for segmenting the surface of a tyre including at least one groove.

Preferably, said equipment comprises a source of electromagnetic radiation capable of irradiating a portion of said surface of said tyre with electromagnetic radiation having a wavelength in the visible spectrum.

Preferably, a light sensor capable of acquiring an image of said portion of the irradiated surface of said tyre is provided.

Preferably, a processor is provided, this processor being capable of processing said image by dividing it into regions corresponding to regions of the tyre which do or do not belong to said at least one groove.

Preferably, said processor comprises a calculator capable of calculating a statistical quantity associated with the irradiation by said electromagnetic radiation for each region of said image.

Preferably, said processor comprises a selector capable of determining whether said region of said image does or does not belong to said at least one groove according to the value of said statistical quantity.

The applicant believes that the aforesaid equipment can permit automatic inspection of the tyre surface which overcomes the aforesaid drawbacks of the prior art.

In at least one of the aforesaid aspects, the present invention can have at least one of the following preferred characteristics.

In a preferred example, irradiating a portion of said surface includes:

using an almost telecentric source of said electromagnetic radiation for irradiating said portion.

In fact, the applicant has observed that, depending on the type of characteristic and/or defect to be observed on the tyre surface, the type of lighting to be provided on the tyre is significant. For example, it has been observed that, for the detection of certain types of defect, lighting with a beam of essentially parallel rays, in other words with an almost telecentric device, is the solution providing the greatest accuracy.

Additionally or alternatively, furthermore, irradiating a portion of said surface includes the fact that said electromagnetic radiation is essentially grazing with respect to a bottom surface of said at least one groove.

Depending on the type of defect or characteristic being searched for, the angle between the incident radiation and the tyre surface may be varied, thus making the identification of the defect or characteristic as simple as possible in the acquired image. For some defects or characteristics located within the grooves, the best radiation is one which is essentially grazing with respect to the bottom surface of the groove.

Preferably, the invention includes:

detecting an identification code of said tyre;
positioning said tyre for said irradiation operation in accordance with said identification code.

As is known, tyres have varying sizes and tread designs. The arrangement and depth of the grooves may therefore vary considerably between one model of tyre and another. In order to simplify the processing of the acquired images, it is therefore preferable to know the type of tyre on which the segmentation is conducted, for example by reading an identification code of the tyre such as a bar code, in order to discover the characteristics of the tyre and position the source of light radiation and/or the light sensor in the most convenient way with respect to the surface of the tyre to be irradiated.

In a preferred example, irradiating a portion of said surface of said tyre by electromagnetic radiation includes:

irradiating said portion by means of radiation having one of a plurality of main irradiation directions, and
selecting a radiation having a different main direction among this plurality.

As stated above, a characteristic or defect of the tyre surface is more or less evident in the image of the tyre surface which is acquired, according to the type of radiation incident on the tyre surface. In greater detail, a defect or characteristic may be more or less accentuated in the acquired image of the irradiated portion of the surface, according to the main direction of propagation of the electromagnetic radiation. According to the invention, provision is made in a preferred example to introduce a plurality of radiation sources, each of which emits an electromagnetic radiation incident on the tyre surface, with an angle of incidence differing from one source to another. Thus, by "switching on" or "switching off" the optimal source for the type of characteristic or defect concerned, it is possible to carry out a plurality of processing operations in a limited time to make a complete inspection of the tyre surface.

Additionally, positioning said tyre includes rotating and/or translating said tyre so as to irradiate said portion in a predetermined direction.

Preferably, the radiation source includes a LED.

Even more preferably, the radiation source includes a linear array of LEDs.

The applicant has observed that the use of LEDs enables lighting to be provided in the required direction in a flexible and relatively economical way.

Preferably, said source of electromagnetic radiation is almost telecentric.

Preferably, a plurality of sources of electromagnetic radiation is provided, these sources being capable of irradiating with electromagnetic radiation, and each source having a main direction of irradiation which differs from the other sources of the plurality.

Preferably, said light sensor includes a linear scanning video camera.

Preferably, the equipment according to the invention includes a movement device capable of causing the movement of said surface of the tyre relative to said source of electromagnetic radiation.

Preferably, the equipment comprises movement devices for providing relative movement of at least two among said source, said light sensor and said tyre.

In a preferred example, at least one between said light sensor and said source is moved by a robotic arm.

Even more preferably, said light sensor and said source are fixed together and moved by the same robotic arm.

Thus the tyre is positioned in the best way for the aforementioned processing.

Preferably, devices are provided for translating and/or rotating said tyre in such a way that said portion of said surface is irradiated by said source.

In an exemplary embodiment, said electromagnetic radiation includes a radiation having a wavelength in the range from 495 nm to 570 nm.

The applicant has observed that, when certain defects or characteristics of the tyre are to be detected and the aim is to make them more apparent in the images of the grooves, the light that gives rise to fewer errors is green light.

Advantageously, when a main longitudinal direction is defined in said groove, said operation of segmenting said image into said regions includes segmenting said image into regions that are essentially parallel to said main longitudinal direction.

Generally, a groove has a main direction along which it extends and a transverse dimension, also called width. The applicant has found that segmenting the image into regions that lie parallel to the main direction of the groove simplifies the process of segmenting the surface. Essentially, where a digital image formed by pixels is concerned, the examination is conducted by dividing the image into areas of pixels which are essentially "columns" of pixels parallel to the direction of extension of the groove, so that the area is either "all inside" or "all outside" the groove, except in the case of the edge regions.

Preferably, the size of said groove is not less than about 2 mm.

Preferably, determining whether said region of said image does or does not belong to said groove includes
  dividing said image into a plurality of regions;
  calculating a value of said statistical quantity for each region of said plurality;
  calculating the ratio between two values of said statistical quantity of two separate regions of said plurality;
  wherein one of the two regions of said plurality belongs to said groove and one does not belong to said groove when said ratio has a value outside a predetermined range.

Additionally or alternatively, two regions of said plurality both belong to said groove or both do not belong to said groove when said ratio has a value within said predetermined range. The applicant has verified that segmenting the image into groove regions and regions outside grooves can be carried out in a relatively simple way by analysing a statistical quantity relating to separate regions of the image. In other words, the applicant has verified that there are statistical quantities which differ markedly from each other according to whether they are calculated in a "groove" region or in a "non-groove" region. Therefore, when the ratio between these two quantities is sufficiently different from unity, this means that the two regions of the image under examination belong to different groups, one belonging to the groove regions and one to the non-groove regions. However, if the ratio is close to unity, the investigated regions both belong to the same group.

Preferably, said statistical quantity is a standard deviation, said predetermined range extending from about 0.8 to about 1.25.

The applicant has verified that, if the standard deviation is chosen as the statistical quantity, the predetermined range most suitable for allowing segmentation of the image is that given above.

Preferably, calculating said statistical quantity for each region of said image includes calculating a value of the dispersion of the data relative to a variable related to a light intensity of each region of the image of said portion of the irradiated surface acquired.

The applicant has verified that this difference between groove and non-groove areas is particularly pronounced when the dispersion of the data correlated with the light intensity of the groove and non-groove regions is calculated. It can be seen that the dispersion of data is greater in the case of non-groove areas, enabling these areas to be identified on the basis of the difference between the observed values and those for the groove regions where the dispersion is smaller.

More preferably, calculating said statistical quantity for each region of said image includes calculating the standard deviation of the data relative to a variable related to the light intensity of each region of the image of said portion of the irradiated surface acquired.

Even more preferably, calculating said statistical quantity for each region of said image includes calculating the standard deviation of the luminance of each region of the image of said portion of the irradiated surface acquired.

In an exemplary embodiment, calculating a statistical quantity associated with the irradiation for each region of said image includes:
  calculating said statistical quantity for a region of said image including a column of pixels having a width of at least one pixel.

As stated above, the acquired image, generally a digital image, is an image formed by a plurality of pixels. It is therefore processed by processing "areas of continuous pixels" which are preferably columns of pixels having a base width of at least one pixel.

Preferably, a mean of said statistical quantity is calculated for at least three columns of pixels. In other words, for example, the regions of the image can be composed of columns with a width of 3 pixels and a height depending on the mean dimensions of the groove, for which the reference statistical quantities are calculated. When the desired statistical quantity has been calculated for a first region, the calculation is repeated for another region of the same size, "shifted by one pixel" with respect to the first region, and so on. Therefore, for each column of pixels with a width of one pixel, there are three values of the statistical quantity concerned, and the mean of these is taken. However, other means with a different number of data can be calculated and are included in the present invention.

The grooves present in the tyre surface can be in any position and can be of any type, in either the radially inner surface or the radially outer surface of the tyre.

Preferably, said at least one groove is present on a tread band of said tyre.

Even more preferably, said at least one groove is present on a shoulder area of said tyre.

The applicant has pointed out that the pre-processing that is carried out, in other words the division of the image into groove areas and non-groove areas, simplifies any subsequent processing, such as processing for identifying defects in the grooves of the tyre.

Preferably, said equipment includes a further processor capable of processing at least one of said regions belonging to said at least one groove, for the detection of defects within it.

The further processor may also coincide with the main processor; in other words, a single processor may perform all the calculations relating to the method of the invention.

More preferably, said further processor is capable of processing defects having a size of not less than about 0.5 mm.

Even more preferably, said further processor is capable of processing defects comprising an exposed cord.

Preferably, processing said region belonging to said groove includes using a wavelet transform and/or a morphological operator.

In order to identify the defects, known methods and algorithms are used, for example wavelet transforms, morphological operators, and the like. An example of methods and algorithms that can be used for the purposes of the present invention can be found in R. Gonzalez, R. Woods, "Digital Image Processing", Prentice Hall, 2008.

BRIEF DESCRIPTION OF THE DRAWINGS

The characteristics and advantages of the invention will be made clearer by the detailed description of some preferred examples of embodiment thereof, illustrated, for the purposes of guidance and in a non-limiting way, with reference to the attached drawings, in which:

FIG. 4 is a perspective view from above of a portion of a tyre to which the method according to the invention is applied;

FIGS. 6a and 6b are, respectively, a magnified view of part of the image of FIG. 4 and a histogram of the luminance calculated over the area enclosed by the region shown in broken lines in FIG. 6a, which is located outside the groove in this case;

FIGS. 7a and 7b are, respectively, a magnified view of part of the image of FIG. 4 and a histogram of the luminance calculated over the area enclosed by the region shown in broken lines in FIG. 7a, which is located within a groove in this case;

FIGS. 8a and 8b are, respectively, a magnified view of part of the image of FIG. 4 and a histogram of the luminance calculated over the area enclosed by the region shown in broken lines in FIG. 8a, which is located at the extreme left-hand boundary of the groove in this case;

DETAILED DESCRIPTION OF THE INVENTION

Figure 1:
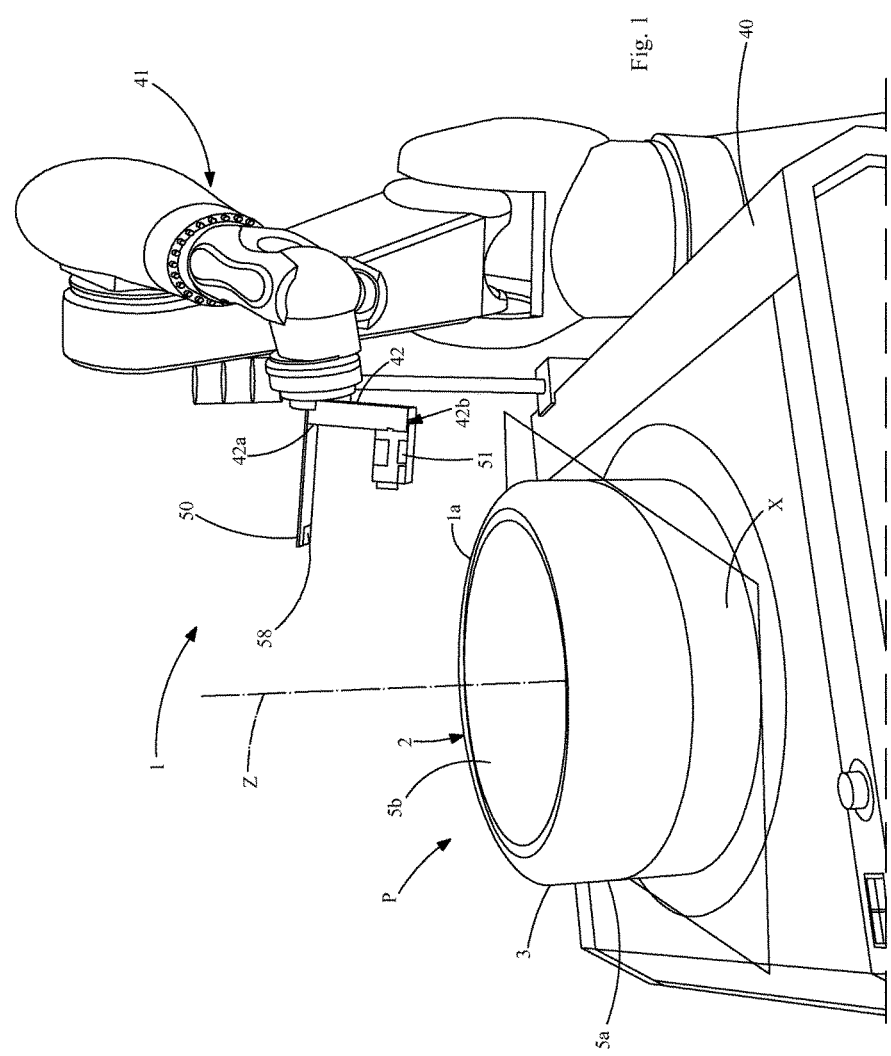
FIG. 1 is an axonometric view of an exemplary embodiment of equipment for segmenting a tyre.
Figure 2:
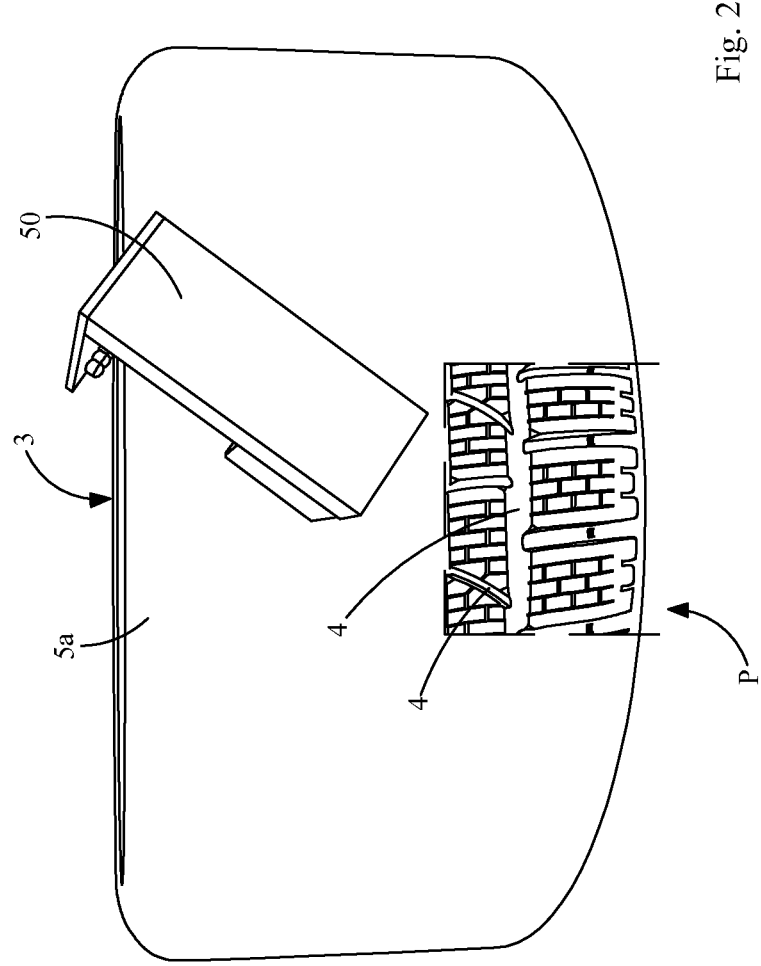
FIG. 2 is a magnified perspective view from above of a component of the equipment of FIG. 1.

With initial reference to FIGS. 1 and 2, the number 1 indicates the whole of equipment for segmenting the surface of a tyre P.

In detail, the tyre P, shown schematically in FIGS. 1 and 2, defines an axis Z, substantially coinciding with its own axis of rotation, and a plane X, the trace of which can be seen in FIG. 2, which is the equatorial plane of the tyre, in other words the mid-plane perpendicular to the axis of rotation Z. The tyre comprises a carcass structure 2 including at least one carcass ply (not shown in the drawings) which is associated for operation with a pair of annular fixing structures (one of which is visible in FIG. 1 and is indicated by 1a), a tread band 3 in a radially external position to said carcass structure, and a belt structure (not shown) interposed between the carcass structure and the tread band 3. Planes containing the axis of rotation of the tyre are indicated as radial planes.

In the following text, the tyre P will be described with reference to its equatorial plane X and to its radial planes, and therefore the references to "axially inner/outer" or "radially inner/outer" are to be interpreted with reference to the equatorial plane X and to the axis of rotation Z respectively. Surfaces delimiting the tyre, such as a radially inner surface 5b, which for example may coincide with an airtight component called a liner, and a radially outer surface 5a, typically the outer surface of the tread band 3, are therefore defined in the tyre.

A plurality of grooves is formed on the tread band 3, all these grooves being generically indicated by 4, delimiting a plurality of blocks 5 (visible only in FIG. 4, where a magnified portion of the tyre is shown), and being arranged in succession along a circumferential direction of the tread band 2.

The grooves 4 may be circumferential, in other words extending along the whole length of the circumference of the tyre P, or may extend over a portion of the circumference only.

Additionally, they may extend along said circumferential direction, along a direction essentially perpendicular to the circumferential direction (in the case of transverse grooves), or along a direction inclined with respect to both of these. For example, FIG. 4 shows a circumferential groove and a plurality of transverse grooves which are essentially perpendicular to the circumferential groove.

Furthermore, the grooves may have an essentially rectilinear shape, or in other words may essentially extend along a main longitudinal direction only, or a curved, undulating or zigzag shape, meaning that projections on axes perpendicular to the main direction of extension will be non-zero.

In the case of winter tyres, one or more sipes 6 may be formed in each block 5, as shown in FIG. 4, these sipes extending, in the preferred example described herein, along a perpendicular direction with respect to the circumferential direction of the tyre P. However, the arrangement and configuration of the sipes, if present, is not significant for the purposes of the present invention.

It is to be understood that alternative embodiments, in which the shape of the blocks 5 and the arrangement of the grooves 4 and any sipes 6 are planned differently on the tread band 3 in order to meet specific functional requirements, may easily be produced by persons skilled in the art.

Each groove 4 may be blind, in other words completely separate from the other grooves of the tread band 3, or may open, at one or both of its opposing longitudinal ends 6a, 6b, into an additional groove 4 or a pair of additional grooves delimiting the block 5, as for example in FIG. 4, so as to pass through the block from side to side.

Figure 5:
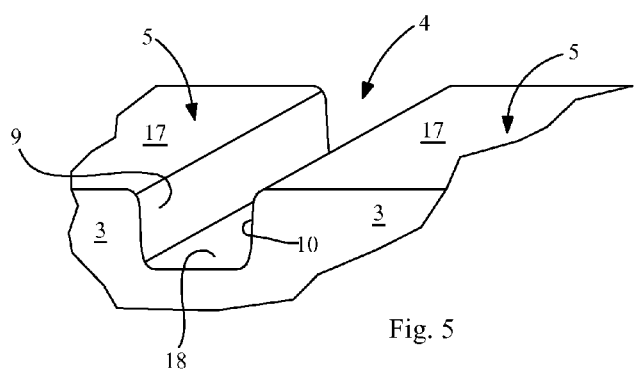
FIG. 5 is a partial perspective view of a groove belonging to a tyre.

With reference to FIG. 5, which is a magnified schematic representation of a groove, the groove 4 extends between a top surface 17 of the groove, opening on to the tread surface 3, and a bottom surface 18 of the groove, in a radially inner position in the tread band 3 with respect to the top surface 17. The groove 4 separates from each other a first and a second block, which are again identified by the number 5, and which are spaced apart by a distance which preferably remains essentially constant along the longitudinal extension of the groove 4 and is equal to the width of the latter. This width is preferably greater than about 2 mm.

However, grooves 4 having a variable width along their longitudinal extension are also included in the present invention.

The groove 4 defines a wall 9 of the first block and a wall 10 of the second block, these walls facing each other and extending from the top surface 17 to the bottom surface 18. The walls 9 and 10 are identified as lateral walls of the groove 4.

The two walls 9 and 10 are essentially flat, and therefore have a profile with an essentially rectilinear extension. However, curved walls, in the case of a groove 4 having a non-rectilinear longitudinal extension, are also possible and are covered by the invention.

A typical depth of the grooves 4, in other words the radial distance between the bottom wall 18 and the top wall 17, is for example in the range from about 4 mm to about 12 mm, depending on the use of the tyre P (racing tyre, winter tyre, etc.).

The bottom wall 18, and also the top wall 17, can be considered to be essentially flat locally, in the sense that, although the curvature due to the toroidal geometry of the tyre causes the whole of the tyre surface to be convex, points within a sufficiently small area can be considered to lie on a plane tangent to the tyre surface.

In the above description, reference is made to a groove 4 formed in the surface of the tread band 3. A similar groove, with a bottom wall 18 and top wall 17 defined in the same way, may be present in the radially inner part 5b of the tyre P. According to the invention, the equipment 1 is used to segment a portion of the inner or outer surface 5a, 5b of the tyre P, preferably, but not necessarily, for the purpose of detecting defects and/or characteristics of the tyre in this examined portion of the surface. A defect or characteristic that should preferably be detected, regardless of its type, is identified below by the number 70.

The equipment 1, shown schematically in FIG. 1, on which the tyre P described above is placed, comprises, for example, a base 40 on which the tyre rests. As shown in FIG. 1, the tyre P may be laid flat on the base 40, in other words with its equatorial plane X parallel to the base, or alternatively the base may be perpendicular to the equatorial plane and the tyre P may be kept in a vertical position by one or more fixing elements which are not shown.

Figure 3:
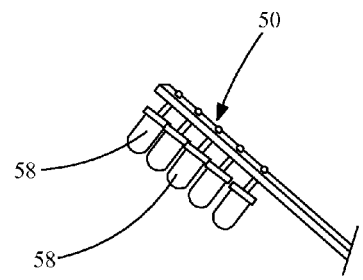
FIG. 3 is a magnified perspective view of a further component of the equipment of FIG. 1.

The equipment 1 also includes an electromagnetic radiation source 50, shown on a magnified scale in FIG. 3, and a light sensor 51. The equipment further comprises a movement device for putting the source 50, the light sensor 51 and tyre P into relative motion so as to position the light sensor and the source at the desired position and distance with respect to one of the radially inner or outer surfaces 5a, 5b of the tyre P.

Preferably, the movement device is such that the light sensor and the source move as one unit. In the example of FIG. 1, the movement device includes a robotic arm 41, to which the light sensor and source are coupled, and which can move away from and/or towards the tyre P, which remains stationary on the base 40. Preferably, the robotic arm 41 is an anthropomorphic robotic arm with at least three axes. In a further representative example, the tyre P is rotated and/or translated on the base 40 by further rotation and/or translation devices (not shown), while the light sensor and/or the source are fixed. Furthermore, both the tyre P and the source and/or light sensor may be movable; for example, the tyre P may also be moved so as to simplify the movement of the robotic arm 41, or in such a way that the latter can be positioned in the proximity of any point on the surface of the tyre.

In the preferred example of FIG. 1, the light sensor 51 and the source 50 are moved as one unit.

The source 50 is moved by the movement means so as to illuminate a portion of the surface of the tyre P at a predetermined angle. In a preferred example, the source is positioned so as to illuminate the tyre surface with an essentially grazing light.

The radiation source 50 emits electromagnetic radiation in the visible spectrum, and more precisely within a range from about 380 to about 760 nm. Preferably, the source 50 includes a light-emitting diode (LED) 58, and even more preferably it includes a plurality of LEDs 58. In a preferred embodiment, the LEDs are arranged in a linear array, one after another, as shown in FIG. 3. Preferably, the LEDs are positioned at the smallest possible distance from the light sensor 51, for example at about 5 cm from the light sensor 51. For example, they may be high-luminosity LEDs with a half angle of irradiation of 15 degrees, supplied with electrical power. Additionally, the source 50 is preferably almost telecentric.

Figure 12:
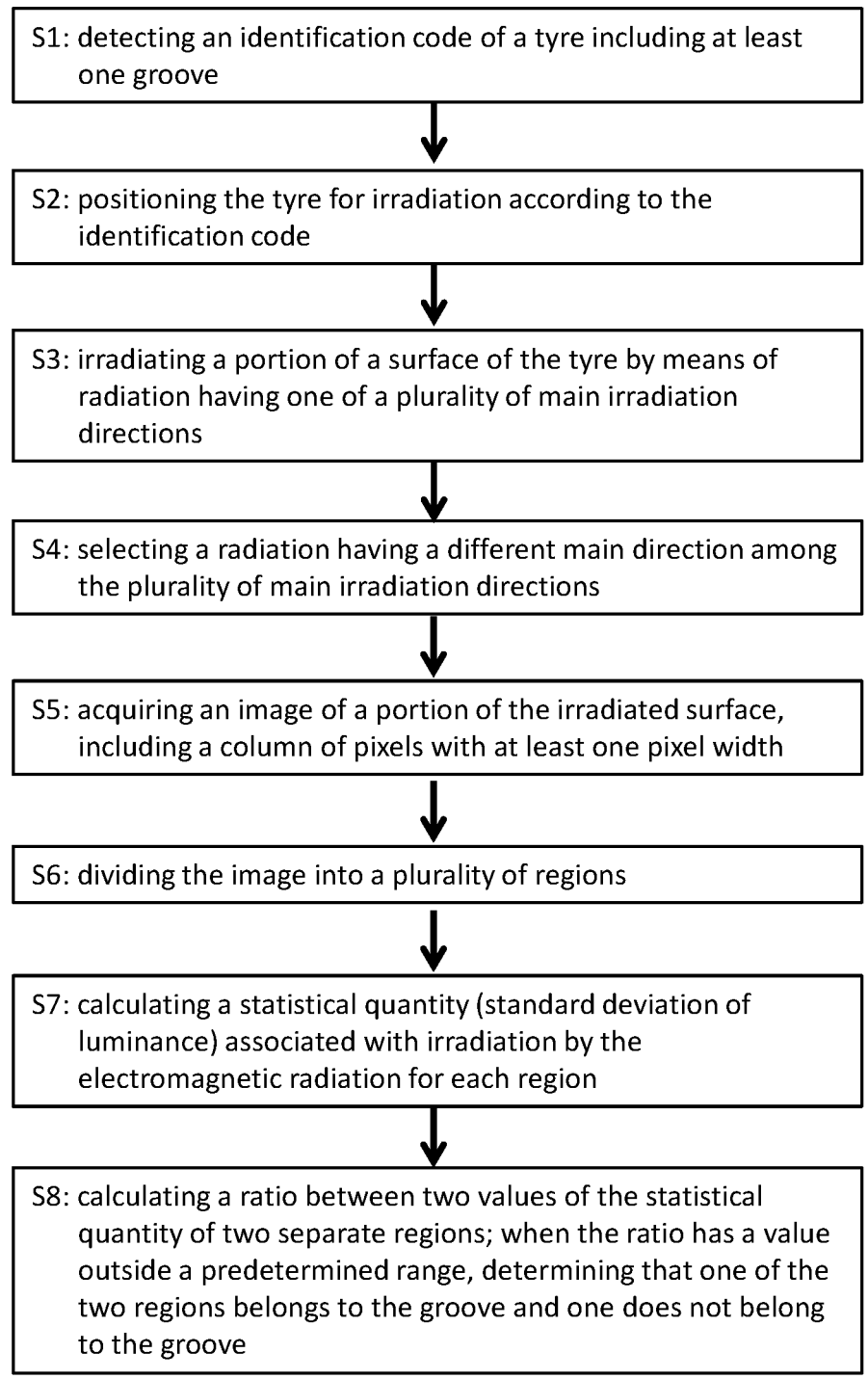
FIG. 12 is a flow diagram showing an embodiment of the invention.

In an exemplary embodiment, the electromagnetic radiation emitted by the source 50 is green. Preferably, the radiation source emits electromagnetic radiation along a main direction, which can be selected. Alternatively, there may be a plurality of radiation sources, each used for irradiating a portion of the tyre along a different main direction (FIG. 12, S3, S4).

The light sensor 51 includes, for example, a video camera, more preferably a colour linear scanning video camera, for acquiring an image of a surface portion of the tyre P, particularly the portion of the tyre that is illuminated by the source 50. Preferably, the video camera is capable of acquiring an image at an essentially constant angle of view and with an essentially constant angle of incidence of the electromagnetic radiation.

Figure 11:
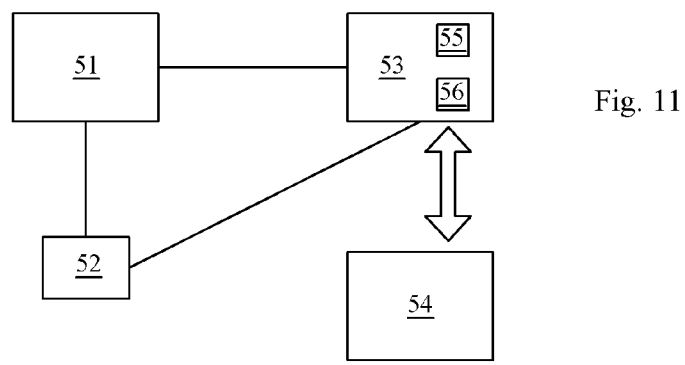
FIG. 11 is a diagram of a detail of the equipment of the invention shown in FIG. 1.

With reference to FIG. 11, the light sensor 51 is associated for operation with a memory 52, which may be inside or outside the light sensor itself, for the purpose of storing the data relating to the acquired images of the tyre. The images, in other words the data, acquired in this way are also processed by a processor 53, for example part of an external unit such as a personal computer or other device known in the art.

The minimum size of defect that can be detected by means of the invention depends on the resolution of the light sensor 51. In particular, in the case of a linear scanning video camera, it depends primarily on the number of pixels of the sensor used. In the case of the aforementioned drawings, the scale is equal to $1/10$ mm per pixel, by way of example. In the preferred example, the minimum size of the defect and/or characteristic 70 that can be detected is about 0.5 mm. On the other hand, the scanning frequency is preferably related to the rotation speed of the tyre, and it is specified so as to achieve the resolution, for example the aforementioned resolution of $1/10$ mm.

The equipment 1 may include other devices and other radiation sources and/or light sensors, so as to illuminate a portion of the surface of the tyre P alternatively with different radiation spectra or in combination with these spectra in order to carry out different types of inspection and analysis. Furthermore, the image acquired by means of the light sensor 51 may be processed separately by separate processors or by the same processor 53, using separate algorithms, in order to identify different relevant characteristics of the tyre P, each characteristic preferably being detectable by a separate method.

The equipment 1 also preferably includes input devices 54, electrically connected to the processor 53, through which an operator can send commands to the processor, for example for selecting the type of characteristic or defect to be identified, for obtaining information relating to the type of tyre placed in the equipment 1, and for other purposes. The input devices 54 may also operate automatically without any action by the operator; for example, the equipment may include a reader for an identification code such as a bar code (not shown in the drawings), this reader being capable of reading a code impressed into the tyre P which carries information on the structural characteristics of the tyre. This code reader may be actuated by the operator.

The operation of the equipment 1 and the method of the invention are described below. Depending on the type of characteristic or defect to be detecting in the radially outer and/or radially inner surface 5a, 5b of the tyre P, it may be preferable not to examine the whole of the inner and/or outer surface using the method or the equipment of the invention, but only a part of the surface. Therefore, an optional first action is to identify the area of the radially inner and/or outer surface 5b, 5a of the tyre P to be segmented.

Optionally, therefore, according to the method of the invention, this part, which may be either continuous, in other words a single area of the inner and/or outer surface of the tyre, or separated into areas not connected to each other, is divided into portions 100, each of which is illuminated as described below. The size of the portion 100 depends on the characteristics of the source 50, the light sensor 51 and the type of characteristic or defect to be examined: for example, if it is desired to obtain a condition in which the electromagnetic radiation is essentially grazing with respect to the examined portion, the portion must be sufficiently "small" to ensure that the curvature of the tyre does not excessively affect the analysis. Clearly, this portion size therefore depends on the radius of the tyre, and more generally on its type, the shoulder width, etc.

In FIG. 4, a portion 100 of the outer surface 5a of the tyre P is identified with the aid of a rectangle to make it visible. The portion 100 includes the groove 4 and a portion of top surface 17. A single portion 100 is shown, but numerous portions 100 may be present in the surface of the tyre P.

Preferably, this portion 100 is located on the tread 3 of the tyre, and more preferably on a shoulder of the tyre P.

Accordingly, when the tyre P has been positioned on the base 40 of the equipment 1, the method of the invention optionally provides for suitable automatic commands or operator commands to be sent to the processor 53 in order to move the light sensor and/or the source and/or the tyre relative to each other, so as to orientate the tyre with respect to the source and light sensor in the most favourable way in order to obtain an image with the desired illumination of the portion 100. Clearly, the tyre and/or the light sensor and/or the source are preferably moved again for each different portion 100, to enable the light sensor, source and tyre to be repositioned in an optimal way with respect to the new portion. The use of the robotic arm 41 and a fixed coupling between the light sensor 51 and the source 50, using for example a U-shaped bracket 42 on whose opposing arms 42a, 42b the source and light sensor are fixed, ensure that access is essentially possible to any part of the tyre P.

With reference to the portion 100 shown in FIG. 4, in the present preferred example the tyre is positioned so that the source 50 illuminates the bottom wall 18 of the groove 4 in an essentially grazing way, so that only one groove is present within the portion 100, and so that the main longitudinal direction of the groove is essentially parallel to the scanning axis of the linear video camera.

All these data may be present in the identification code of the tyre which "informs" the processor 53 of the constructional data of the tyre P, so that the correct positioning and the correct inclination are automatically calculated (FIG. 12, S1).

After the optional positioning according to the reading of the identification code of the tyre P (FIG. 12, S2), the predetermined portion 100 of the area to be analysed is illuminated by means of the radiation source 50 (FIG. 12, S3, S4). An image 100a of the illuminated portion 100 is acquired by means of the light sensor 51. Examples of the acquired image 100a are shown in FIGS. 6a, 7a and 8a. (FIG. 12, S5). The image 100a is then saved to the memory 52, and is then processed by the processor 53. The processing may take place simultaneously with the acquisition of the image; in other words, in the case of a linear video camera for example, each acquisition of a line of pixels of the image takes place simultaneously with the processing of the line of pixels. Alternatively, it may take place sequentially; in other words, the whole image is acquired and stored initially, and is processed subsequently.

The image 100a is processed so as to segment it into regions 101 which belong to the groove and regions 102 which do not belong to the groove. In other words, the image 100a is segmented into areas, or regions, in which the groove is present and into areas in which no groove is present, regardless of any other element, apart from the groove 4, that may be present (FIG. 12, S6).

At the end of the operation of segmentation of the image 100a, described below, an overall groove region 101' is defined, as a combination of all the groove regions, and an overall non-groove region 102' is also present. Referring again to FIGS. 6a, 7a and 8b, the overall groove region 101' and non-groove region 102' are illustrated.

A region 101 or 102 of the image 100 a may be, for example, a column of pixels: as shown in FIGS. 6a, 7a, 8a, the column shown as a broken line represents the region for which the aim is to determine whether it belongs to the groove regions 101 or to the non-groove regions 102 (in other words, whether the column of pixels is located inside or outside the groove 4) (FIG. 12, S5). The columns of pixels represent the scanning lines of the linear video camera. However, regions having different sizes and geometries can also be considered in the present invention.

In order to determine whether a region 101, 102 is or is not a groove region, it is processed in the following manner. Initially, a variable, in other words a physical quantity, is calculated for each region, this variable being related to the irradiation of this area. For example, it may be related to the light intensity of the surface region. For example, the luminance of each pixel is calculated on a pixel by pixel basis for each region 101, 102. For example, FIG. 6b shows a histogram in which, for each pixel of the column of pixels identified by 102 in FIG. 6a, which has a base of 3 pixels and a height of 600 pixels (corresponding to an area of 0.3 cm by 6 cm), the luminance of the pixel is shown, as detected from the image 100a. Therefore, the graph in FIG. 6b is a visual representation of the luminance of each pixel along the whole column of pixels (which makes up the region 102), including 1800 pixels in this case. Preferably, the column has a base of more than one, for example three, as illustrated above: the video camera 50 follows lines with an amplitude of one pixel and calculates the statistical parameter by taking into account the current column of pixels of unit width, as well as the preceding and subsequent columns (the calculation may in fact be performed one column late).

Similarly, the graphs of FIGS. 7b and 8b represent in histograms the values of the luminance, pixel by pixel, of the column of pixels shown in broken lines in FIGS. 7a and 8a respectively. From this plurality of values, a single statistical quantity is calculated, for example by means of a calculator 55 forming part of the processor 53, for the whole of the region 101, 102, this quantity being a single quantity associated with the region, by means of which it is possible to determine whether the region under examination does or does not belong to the groove. Preferably, this statistical quantity of the region is a statistical quantity identifying the dispersion of the data from the variable related to the irradiation. Even more preferably, this statistical quantity is the standard deviation σ of the data of the calculated physical quantity; in particular, the standard deviation of the values of luminance for the column of pixels is obtained, in other words:

$$\sigma_x = \sqrt{\frac{\sum_{i=1}^{N}(x_i - \bar{x})^2}{N}}$$

where $\bar{x}$ is the mean of the values of the variable. (FIG. 12, S7)

Referring again to the graphs 6b, 7b, 8b, as has been stated they correspond to the values of luminance for each pixel of the column of pixels shown in FIGS. 6a, 7a, 8a respectively. As can be seen, the first column of pixels, in FIG. 6a, is completely outside the groove, and should therefore be categorized as a "region not belonging to the groove", that is to say region 102. On the other hand, the second column of pixels, in FIG. 7a, is completely inside the groove 4, and should therefore be categorized as a "region belonging to the groove", that is to say region 101. In FIG. 8a, the third column of pixels is "in the transitional area" between the groove and the outside, and therefore it may or may not be defined as a groove region, depending on predetermined initialization settings. In the case in question, it is considered to be a non-groove region.

As can be clearly seen from a comparison between the histograms of FIGS. 6b and 7b, the dispersion of the data in a region outside the groove is much greater than the dispersion of the data in a region inside the groove, and this fact is demonstrated by the two values of standard deviation, which are, in particular, equal to 101.31 outside the groove and 58.26 inside it. Where the examined region is located in a transition region (as in the case of the third column of pixels shown in FIG. 8a), the value of the standard deviation is "halfway" between the aforesaid two values, being equal to 99.01.

Figure 9:
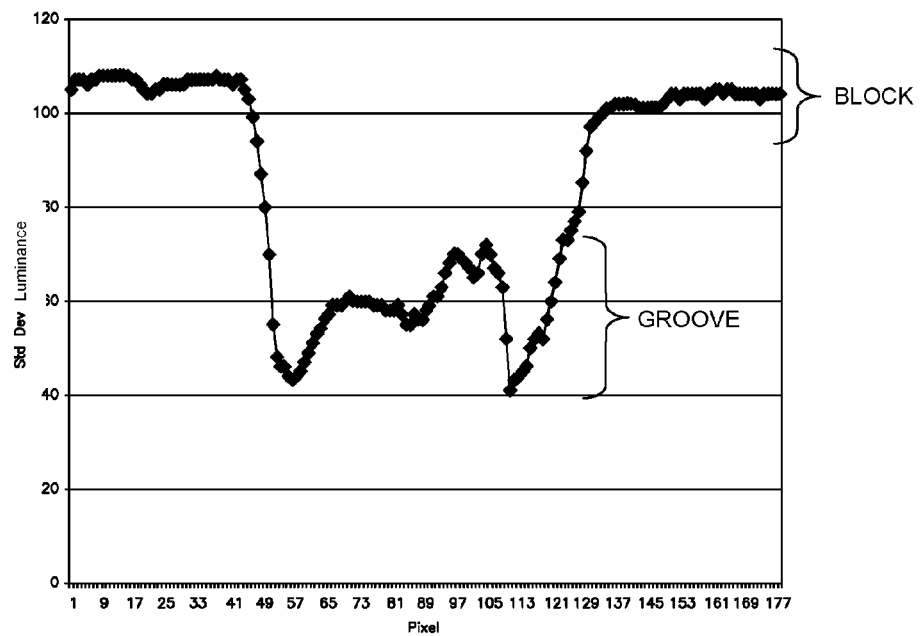
FIG. 9 is a graph showing the variation of the standard deviation of the luminance as a function of the number of pixels (the longitudinal coordinate)

By repeating the calculation of the standard deviation, or of another statistical quantity, for all the regions making up the image 100a, we obtain a graph like that of FIG. 9: the horizontal axis shows the pixel number of each position in the column of pixels in the image 100a, and the vertical axis shows the corresponding value of the standard deviation of the luminance of the column of pixels at this position. As the graph shows, there is a clear differentiation between the groove regions and the non-groove regions, the regions belonging to the groove yielding a value of the standard deviation which is much smaller than the corresponding value for the non-groove regions.

In particular, for example, in order to determine whether two regions (such as the first and second columns of pixels of FIGS. 6a and 7a) both belong to the groove 4 or both do not belong to the groove 4, or whether one column is a groove region while the other column is not a groove region, it is possible to calculate the ratio between the two values of the statistical quantity calculated for the two regions. (FIG. 12, S8). In the present case, the calculation of the ratio between the standard deviation of the luminance of the first column and the standard deviation of the second column yields a value of 1.73. Preferably, if the value of the ratio is greater than 1.25 or less than 0.8, the two regions belong to two separate groups; in other words, one is a groove region and the other is a non-groove region, as in the present case. However, if this ratio is in the range from 0.8 to 1.25, both of the regions belong to the same group, which may be the groove or the non-groove group.

In this case, the threshold value of the standard deviation is taken to be 80, for a region to be considered as belonging to the groove.

It follows from the above that the calculation of a statistical quantity such as the standard deviation can be used to determine, for each region of the image 100a, whether or not it belongs to the groove 4, and therefore to segment the image 100a into regions 101 and 102, in other words to select each region, by means of a selector 56, positioning it in the group to which it belongs and thereby forming the overall groove region 101' and non-groove region 102'.

The operation described above is repeated for all the relevant regions 100 of the tyre P, forming the area which is to be segmented, as stated above.

After the segmentation, according to the method of the invention, provision is optionally made to detect defects 70 in the portion 100 of the tyre P which has been segmented into groove regions 101 and non-groove regions 102. This detection includes the processing of only one of two groups of regions, in other words the processing of only the groove regions 101 or only the non-groove regions 102. Preferably, only the groove regions 101 are considered.

Figure 10A:
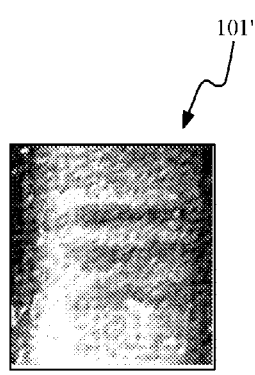
FIGS. 10a, 10b and 10c show three images corresponding to three successive operations of processing a region of the image of FIG. 4 according to three steps of the method of the invention.

FIG. 10*a* shows a detail of the overall groove region 101' derived from the segmentation of the image 100*a* of FIGS. 6*a*, 7*a*, 8*a*.

A possible defect 70 detectable in the detail of the overall groove region 101' is, for example, an exposed cord present inside the groove 4, which is identified in FIGS. 5*a* to 8*a* by an oval of broken lines.

Figure 10B:
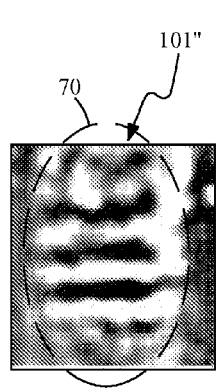
Figure 10C:
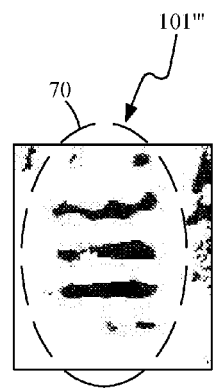

This overall groove region 101' is therefore processed by suitable algorithms known in the technical field of image processing, for example by means of the processor 53 or another additional processor (not shown). In the illustrated example, the overall groove region 101' of FIG. 10*a* is processed by means of a fourth-order wavelet transform, thus obtaining the processed overall region 101" of FIG. 10*b*. Using a further optional processing operation, for example by establishing a threshold on the grey values of the image, the doubly processed overall region 101''' of FIG. 10*c* is obtained, where the "ripples" which are a sign of the presence of an exposed cord 70 are clearly visible.

Evidently, the type of algorithm used depends on the type of defect to be identified or displayed, and therefore numerous other processing operations can be performed by means of the method and equipment of the invention. Furthermore, a plurality of processing operations can be carried out simultaneously or successively in order to identify different types of defect in the same region.

The invention claimed is:

1. A method for segmenting the surface of a tyre comprising at least one groove, comprising:
    irradiating a portion of said surface of said tyre with electromagnetic radiation having a wavelength in the visible spectrum;
    acquiring an image of said portion of the irradiated surface; and
    processing said image so as to segment said image into regions corresponding to regions of the tyre which do or do not belong to said at least one groove,
        wherein the processing of said image so as to segment said image comprises:
            calculating a statistical quantity associated with irradiation by said electromagnetic radiation for each region of said image, said calculating a statistical quantity for each region of said image comprising calculating a value of dispersion of data relative to a variable related to a light intensity of each region of said image; and
            determining whether said region of said image does or does not belong to said at least one groove according to a value of said statistical quantity.

2. The method according to claim 1, wherein irradiating a portion of said surface comprises:
    using an almost telecentric source of said electromagnetic radiation for irradiating said portion.

3. The method according to claim 1, wherein irradiating a portion of said surface comprises the fact that said electromagnetic radiation is essentially grazing with respect to a bottom surface of said at least one groove.

4. The method according to claim 1, comprising:
    detecting an identification code of said tyre; and
    positioning said tyre for said irradiation in accordance with said identification code.

5. The method according to claim 1, wherein a main longitudinal direction is defined in said at least one groove, and wherein segmenting said image in said regions comprises segmenting said image into regions that are essentially parallel to said main longitudinal direction.

6. The method according to claim 1, wherein positioning said tyre comprises rotating and/or translating said tyre so as to irradiate said portion in a predetermined direction.

7. The method according to claim 1, wherein irradiating a portion of said surface of said tyre by means of electromagnetic radiation comprises:
    irradiating said portion by means of radiation having one of a plurality of main irradiation directions, and
    selecting a radiation having a different main direction among said plurality.

8. The method according to claim 1, wherein determining whether said region of said image does or does not belong to said groove comprises:
    dividing said image into a plurality of regions;
    calculating a value of said statistical quantity for each region of said plurality;
    calculating a ratio between two values of said statistical quantity of two separate regions of said plurality; and
    where one of the two regions of said plurality belongs to said groove and one does not belong to said groove when said ratio has a value outside a predetermined range.

9. The method according to claim 8, wherein two regions of said plurality both belong to said groove or both do not belong to said groove when said ratio has a value within said predetermined range.

10. The method according to claim 1, wherein calculating said statistical quantity for each region of said image comprises calculating a standard deviation of the data relative to a variable related to a light intensity of each region of the image of the portion of the acquired irradiated surface.

11. The method according to claim 10, wherein calculating said statistical quantity for each region of said image comprises calculating the standard deviation of luminance of each region of the image of said portion of the acquired irradiated surface.

12. The method according claim 8, wherein said statistical quantity is a standard deviation, said predetermined range extending from about 0.8 to about 1.25.

13. The method according to claim 1, wherein calculating a statistical quantity associated with the irradiation for each region of said image comprises:
    calculating said statistical quantity for a region of said image comprising a column of pixels having a width of at least one pixel.

14. The method according to claim 13, wherein a mean of said statistical quantity is calculated for at least three columns of pixels.

15. The method according claim 1, wherein said at least one groove is present on a tread band of said tyre.

16. The method according to claim 15, wherein said at least one groove is present on a shoulder area of said tyre.

17. The method for detecting defects on a surface of a tyre, comprising the method for segmenting the surface of a tyre according to claim 1, comprising:
    processing at least one of said regions of said image belonging to said at least one groove, for the detection of defects within the surface of the tyre.

18. The method according to claim 17, wherein said defect is greater than about 0.5 mm.

19. The method according to claim 17, wherein said defect comprises an exposed cord.

20. The method according to claim 17, wherein processing said region belonging to said groove comprises using a wavelet transform and/or a morphological operator.

21. Equipment for segmenting a surface of a tyre comprising at least one groove, comprising:
- a source of electromagnetic radiation capable of irradiating a portion of said surface of said tyre with electromagnetic radiation having a wavelength in a visible spectrum;
- a light sensor capable of acquiring an image of said portion of an irradiated surface of said tyre;
- a processor capable of processing said image by dividing said image into regions which do or do not belong to said at least one groove, said processor comprising:
  - a calculator capable of calculating a statistical quantity associated with the irradiation by said electromagnetic radiation for each region of said image, said calculating a statistical quantity comprising calculating a value of dispersion of data relative to a variable related to a light intensity of each region of said image; and
  - a selector capable of determining whether said region of said image does or does not belong to said at least one groove according to a value of said statistical quantity.

22. Equipment according to claim 21, wherein said source of electromagnetic radiation is almost telecentric.

23. Equipment according to claim 21, wherein said electromagnetic radiation is essentially grazing with respect to a bottom surface of said at least one groove.

24. Equipment according to claim 21, wherein a size of said groove is not less than about 2 mm.

25. Equipment according to claim 21, wherein said light sensor comprises a linear scanning video camera.

26. Equipment according to claim 21, wherein said radiation source comprises an LED.

27. Equipment according to claim 26, wherein said source of electromagnetic radiation comprises a linear array of LEDs.

28. Equipment according to claim 21, comprising a plurality of sources of electromagnetic radiation capable of irradiating with electromagnetic radiation, each source having a main direction of irradiation which differs from other sources of the plurality.

29. Equipment according to claim 21, wherein said electromagnetic radiation comprises a radiation having a wavelength in a range from 495 nm to 570 nm.

30. Equipment according to claim 21, comprising a movement device capable of causing movement of said surface of the tyre relative to said source of electromagnetic radiation.

31. Equipment according to claim 21, comprising a further processor capable of processing at least one of said regions belonging to said groove, for the detection of defects within said groove.

32. Equipment according to claim 31, wherein said further processor is capable of processing defects having a size of not less than about 0.5 mm.

33. Equipment according to claim 31, wherein said further processor is capable of processing defects comprising an exposed cord.

34. Equipment according to claim 21, comprising movement devices for providing relative movement of at least two among said source, said light sensor and said tyre.

35. Equipment according to claim 21, wherein at least one between said light sensor and said source is moved by a robotic arm.

36. Equipment according to claim 35, wherein said light sensor and said source are fixed together and moved by a same robotic arm.

37. Equipment according to claim 21, comprising devices for translating and/or rotating said tyre in such a way that said portion of said surface is irradiated by said source.

* * * * *